United States Patent [19]

Feder et al.

[11] Patent Number: 5,851,594
[45] Date of Patent: Dec. 22, 1998

[54] AQUEOUS DISPERSIONS BASED ON VISCOUS SILICONE OILS CAPABLE OF CROSS-LINKING ON REMOVAL OF WATER

[75] Inventors: Michel Feder, Lyon; Jean Ulrich, Thernay, both of France

[73] Assignee: Rhone Poulenc Chimie, Courbevoie, France

[21] Appl. No.: 821,172

[22] Filed: Mar. 21, 1997

Related U.S. Application Data

[63] Continuation of Ser. No. 424,324, Jun. 14, 1995, abandoned.

[30] Foreign Application Priority Data

Oct. 20, 1992 [FR] France ................... 92/12518

[51] Int. Cl.$^6$ ........................................ B05D 5/00
[52] U.S. Cl. ..................... 427/387; 523/322; 528/837
[58] Field of Search ................. 523/322; 524/837; 427/387

[56] References Cited

U.S. PATENT DOCUMENTS

| | | | |
|---|---|---|---|
| 4,814,376 | 3/1989 | Tanaka et al. | 524/588 |
| 5,037,878 | 8/1991 | Cerles et al. . | |
| 5,045,231 | 9/1991 | Braun et al. | 252/315.1 |
| 5,140,061 | 8/1992 | Feder | 524/783 |
| 5,145,901 | 9/1992 | Feder | 524/424 |

FOREIGN PATENT DOCUMENTS

| | | |
|---|---|---|
| 0 270 898 | 6/1988 | European Pat. Off. . |
| 0 403 400 | 12/1990 | European Pat. Off. . |
| 0 404 027 | 12/1990 | European Pat. Off. . |
| 0 463 431 | 2/1992 | European Pat. Off. . |
| 1191289 | 5/1970 | United Kingdom . |
| 1523678 | 9/1978 | United Kingdom . |

OTHER PUBLICATIONS

Grossmann et al. (1990) "Tensid–Taschenbuch" Carl Hanser Verlag Müchen Wien, pp. 14–15.
Dr. Otto–Albrecht Neumüller (1983) "Römpps Chemie–Lexikon" Franckh' sche Verlagshandlung Stuggart *HMO–Theorie*, p. 1715.
Gerhartz et al., *Ullmann's Encyclopedia of Industrial Chemistry* A9:297,325.

*Primary Examiner*—Margaret W. Glass
*Attorney, Agent, or Firm*—Scully, Scott, Murphy & Presser

[57] ABSTRACT

Aqueous dispersions containing: a silicone oil (A) which is cross-linkable by condensation, optionally in the presence of a cross-linking agent (B), into an elastomer; optionally a cross-linking agent (B), a silane (C) and a mineral filler (D); and a catalytic amount of a hardening compound (E). Said dispersions are characterized in that they are produced by kneading a mixture of (1) a silicone phase (F) with a viscosity of at least 3 Pas, containing the oil (A) and optionally one or more of components (B), (C), (D) or (E), and 2) an aqueous phase comprising water and at least one surfactant (G), wherein the weight ratio water/water+ surfactant(s) is such that the viscosity of the aqueous phase is preferably at least as high as that of the silicone phase (F); for a sufficient time and with sufficient shear to give an oil-in-water emulsion having a particle size of 0.1–5 micrometers; and optionally by diluting with water until a 25–97 % dry extract is obtained; followed by adding the component(s) not present in the silicone phase (F).

2 Claims, No Drawings

AQUEOUS DISPERSIONS BASED ON VISCOUS SILICONE OILS CAPABLE OF CROSS-LINKING ON REMOVAL OF WATER

This application is a continuation of application Ser. No. 08/424,324 filed Jun. 14, 1995, now abandoned.

The present invention relates to new aqueous dispersions based on viscous silicone oils capable of crosslinking to an elastomer on removal of water, to a process for their preparation and to their use for the production of silicone elastomer products or coatings for the building industry, especially of seals and paints.

It is known that the incorporation of crosslinking agents (especially of the colloidal silica, alkali metal silicate, polyalkoxysilane, polyalkenyloxysilane, polyacyloxysilane, polyketiminoxysilane, polyamino- or polyamidosilane, siliconate, polysilicate, silsesquioxane resin, hydroxylated, alkoxylated or acyloxylated reactive silicone resin type) to an aqueous emulsion of hydroxylated silicone oil makes it possible, after incorporation of fillers and of organometallic catalysts, to obtain a dispersion capable of crosslinking to an elastomer on removal of water (U.S. Pat. Nos. 4,221,688, 4,244,849, 3,355,406, 3,294,725, 4,584,341, 4,618,642, 4,608,412, 4,554,187, EP-A-266 729, EP-A-332 544, EP-A-304 719, EP-A-365 439, FR-A-2 642 765, FR-A-2 637 606 and FR-A-2 638 166).

To obtain an aqueous emulsion of hydroxylated silicone oil it is known to start with an already polymerized hydroxylated oil and to place it in aqueous emulsion, stabilizing the emulsions with an anionic and/or nonionic surface-active agent (Patents FR-A-2 064 563, FR-A-2 114 230, FR-A-2 094 322 and EP-A-169 098). Conventional processes (employing equipment of the colloid mill or homogenizer type) are limited to the emulsification of polymers with a viscosity lower than approximately 5 000 mPa s); more viscous oils can however be successfully emulsified with difficulty but at the expense of the particle size and hence of the stability of the emulsion obtained, the particle size remaining very coarse, much larger than 1 micrometer. This is the reason why the emulsion of the reactive silicone oil which is used is generally obtained by emulsion polymerization of cyclic or linear oligomers of low molecular weight, which are easy to emulsify by conventional processes, that is to say by employing an anionic surfactant which preferably also acts as a polymerization catalyst (U.S. Pat. Nos. 3,294,725 and 3,360,491).

According to the teaching of U.S. Pat. No. 4,608,412, dispersed polymers of very high molecular weights (Mw>200 000) are necessary to obtain sealants which have good mechanical properties, especially of high elongation at break, before and after storage of the dispersion in a leakproof cartridge; according to this process the aqueous dispersions are obtained by emulsion polymerization necessarily in the presence of an ionic, in most cases anionic, surface-active agent, and this is detrimental to the stability of the sealant and lowers the latter's performance (for example adhesiveness, mechanical properties).

The Applicant has now found aqueous dispersions based on α,ω-functional viscous silicone oils which are stable in storage (since they are prepared from aqueous emulsions of silicone oils of fine particle size and able not to contain any anionic surface-active agent) and capable of crosslinking on removal of water to elastomers of high mechanical properties; in addition, these dispersions have the advantage of containing, in a high concentration, a dispersed silicone polymer of a degree of polymerization which is better controlled (in relation to that of a polymer obtained by emulsion polymerization).

According to the invention, these are aqueous dispersions including:
at least one organopolysiloxane oil (A) capable of crosslinking by condensation, if need be in the presence of a crosslinking agent (B), to an elastomer;
if need be, from 0.1 to 100 parts by weight, preferably from 0.5 to 30 parts by weight of at least one crosslinking agent (B) per 100 parts by weight of oil(s) (A);
optionally, up to 50 parts by weight, preferably up to 10 parts by weight of at least one silane (C) per 100 parts by weight of oil(s) (A);
optionally, up to 300 parts by weight, preferably from 3 to 100 parts by weight of a silicious and/or nonsilicious inorganic filler (D) per 100 parts by weight of oil(s) (A);
a catalytically effective quantity of a cure catalyst compound (E);
the said dispersions being characterized in that they are obtained
by kneading a mixture consisting of:
100 parts by weight of a silicone phase (F) with a dynamic viscosity at 25° C. of at least 3 Pa s, preferably of the order of 50 to 1 000 Pa s, a silicone phase including the oil or mixture of oils (A) and optionally at least one of the constituents (B), (C), (D) or (E);
3–20 parts by weight, preferably 5–15 parts by weight of at least one preferably nonionic surface-active agent (G), the HLB of the said surface-active agent or of the mixture of surface-active agents being at least 10, preferably between 10 and 15;
2–20 parts by weight, preferably 3–15 parts by weight of water;
the weight ratio of water/water+surface-active agent(s) being such that the viscosity of the mixture of water+surface-active agent(s) is close to or higher than half of that of the silicone phase (F) and preferably close to or higher than that of the silicone phase (F); for a period and in shearing conditions which are sufficient to obtain an "oil in water" emulsion of particle size of the order of 0.1 to 5 micrometers, preferably of the order of 0.2 to 2 micrometers; then optional dilution with water until a solids content of 25 to 97%, preferably higher than 70%, is obtained;
and then addition of the constituents not present in the silicone phase (F).

For good implementation of the invention the determination of the dynamic viscosity of the silicone phase (F) may be performed, for example, with the aid of a Brookfield viscometer according to the AFNOR NFT standard 76 102 of February 1972.

The oils (A) are α,ω-hydroxylated oils or functional oils containing, per molecule, at least 2 functional groups which are condensable optionally after hydrolysis; they can be denoted by the generic formula (I)

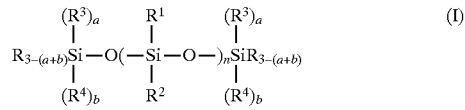

in which formula
a is 0 or 1
b is 0 or 1
with a+b 0, 1 or 2
n has a value which is sufficient to impart the desired viscosity to the polymer of formula (A)
the radicals R are identical or different and denote
an OH group with a+b=2,
an alkoxy or alkenyloxy group containing from 1 to 10 carbon atoms, an aryloxy group containing from 6 to 13 carbon atoms,
an adyloxy group containing from 1 to 13 carbon atoms,
a ketiminoxy group containing from 1 to 8 carbon atoms,
an amino- or amidofunctional group containing from 1 to 6 carbon atoms bonded to silicon by an Si—N bond;
the radicals $R^1$ and $R^2$ are identical or different and denote organic groups which are alkyl or alkenyl aliphatic ones, containing from 1 to 10 carbon atoms, or phenyl aromatic ones, the said groups being optionally substituted by halogen atoms or cyano groups, preferably at least 80% of the said radicals denoting a methyl group;
the radicals $R^3$ and $R^4$ are identical or different and denote organic groups which are alkyl, aminoalkyl, polyaminoalkyl, epoxyalkyl or alkenyl aliphatic ones containing from 1 to 13 carbon atoms or aryl aromatic ones containing from 6 to 13 carbon atoms;
at least 2 and preferably at least 3 functional groups which are condensable optionally after hydrolysis being present per molecule and preferably at least 80% of the radicals $R^1$ to $R^4$ denoting a methyl group.

The following groups may be mentioned by way of example of radicals R:

alkoxy such as, for example, methoxy, ethoxy or octyloxy;

alkenyloxy such as, for example, vinyloxy, hexenyloxy or isopropenyloxy;

aryloxy such as, for example, phenoxy;

acyloxy such as, for example, acetoxy;

ketiminoxy such as, for example, $ON=C(CH_3)C_2H_5$;

aminofunctional ones such as, for example, ethylamino or phenylamino;

amidofunctional ones such as, for example, methylacetamido.

Among the abovementioned aliphatic or aromatic organic radicals there may be mentioned, insofar as the following are concerned:

$R^1$, $R^2$: for example methyl, ethyl, octyl, trifluoropropyl, vinyl or phenyl groups;

$R^3$, $R^4$: for example methyl, ethyl, octyl, vinyl, allyl or phenyl groups;

$—(CH_2)_3—NH_2$ or $—(CH_2)_3—NH—(CH_2)_2—NH_2$.

By way of concrete examples of units $R^1R^2SiO$ present in the oil (A) there may be mentioned:

$(CH_3)_2SiO$, $CH_3(CH_2=CH)SiO$, $CH_3(C_6H_5)SiO$ and $(C_6H_5)_2SiO$.

By way of concrete examples of units $RR_3R_4SiO$ there may be mentioned:

$(CH_3)_2(OH)SiO$, $(OCH_3)_3SiO$, $[O—C(CH_3)=CH_2]_3SiO$, $[ON=C(CH_3)]_3SiO$, $(NH—CH_3)_3SiO$ and $(NH—CO—CH_3)_3SiO$.

A crosslinking agent (B) must be used when the oil (A) is an α,ω-(dihydroxy)polydiorganosiloxane polymer. Numerous crosslinking agents may be employed according to the quantities which are a function of their nature; these are well known to a person skilled in the art. By way of example, a list of crosslinking agents will be found below, with the recommended corresponding quantities, expressed in parts by weight per 100 parts of oil (A):

0.1 to 10 parts of colloidal silica 0.5 to 10 parts of sodium silicate 1 to 15 parts of silica powder (pyrogenic or precipitated silica)

0.1 to 15 parts of an alkaki metal organosilicate (European patent EP-A-266 729)

1 to 100 parts of a microemulsion of a silsesquioxane resin microemulsion (U.S. Pats. No. 3,355,406 and 3,433,780)

5 to 100 parts of reactive silicone resin of low molecular mass, containing alkoxy and acyloxy groups (U.S. Pat. No. 4,554,187)

5 to 100 parts of a toluene-insoluble silicone resin of high mass (EP-A-304 719)

5 to 100 parts of a hydroxylated silicone resin consisting of units of formulae $R'_3SiO_{0.5}$(M) and/or $R'_2SiO$ (D), combined with units of formulae $R'SiO_{1.5}$ (T) and/or $SiO_2$ (Q), R' being chiefly a $C_1$–$C_6$ alkyl, vinyl and 3,3,3-trifluoropropyl radical and a hydroxyl group weight content of between 0.1 and 10%. Resins MQ, MDQ, TDM, and TD (FR-A-2 638 166) may be mentioned very particularly among these resins.

1 to 20 parts of a silane of formula $$(R'')_u SiX_{(4-u)}$$

in which formula R" is a monovalent organic radical, in particular methyl or vinyl, u is equal to 1 or 0, X is an organic condensable and/or hydrolysable group with the same definition as the radical R in formula (I) is above (alkoxy, alkenyloxy, acyloxy, ketiminoxy, alkylamino, alkylamido silanes described especially in U.S. Pat. Nos. 3 294 725, 4,584,341, 4,618,642, 4,608,412, 4,525,565, EP-A-387 157, EP-A-340 120, EP-A-364 375, FR-A-1 248 826 and FR-1 023 477).

The following alkoxysilanes may be mentioned by way of examples:

$Si(OC_2H_5)_4$, $CH_3Si(OCH_3)_3$, $CH_3Si(OC_2H_5)_3$, $(C_2H_5O)_3Si(OCH_3)$, $CH_2=CHSi(OCH_3)_3$, $CH_3(CH_2=CH)Si(OCH_3)_2$, $CH_2=CH(OC_2H_5)_3$, $CH_2=CHSi[ON=C(CH_3)C_2H_5]$, $CH_3Si[ON=C(CH_3)_2]_3$ and $CH_3Si[—C(CH_3)=C_2]_3$ and methyltri(N-methylacetamidosilane), methyltri(cyclohexylaminosilane) etc.

The silanes (C) optionally present in the composition of the dispersions of the invention may be byproducts of synthesis of the oils (A), as well as additives making it possible to modify the physicochemical properties of the silicone elastomer compositions obtained after crosslinking of the dispersions forming the subject of the invention.

The silanes which are byproducts of reaction synthesis of the oils (A) may be denoted by the formula $$(R^5)_{cl} Si(R)_{4-c}$$

in which formula
c is 0, 1 or 2
the radicals $R^5$, which are identical or different, correspond to the radicals $R^3$ and $R^4$ of the oil (A) of formula (I)
the radical R corresponds to the organic radical R of the polyorganosiloxane oil (A) of formula (I). The crosslinking silanes mentioned above may be cited as examples of such silanes. They are generally present in quantities of the order of 0 to 10 parts by weight, preferably of the order of 0 to 5 parts by weight, per 100 parts by weight of oil(s) (A).

The additive silanes modifying physicochemical properties may be especially adhesion promoters such as those described in Patent Application EP-A-340 120. Particular mention may be made of aminopropyltriethyloxysilane, aminopropylmethyldiethoxysilane, glycidyloxypropyltrimethoxysilane etc. They are used in quantities which may range up to 50 %, generally of the order of 0.5 to 10% of the weight of oil(s) (A).

Examples of siliceous fillers (D) are reinforcing fillers such as colloidal silica, pyrogenic and precipitated silica powders, semireinforcing fillers such as diatomaceous earths or ground quartz, insofar as this siliceous additive has not already been chosen as crosslinking agent (B); examples of nonsiliceous fillers are natural calcium carbonate, hydrated alumina, magnesium hydroxide, carbon black, titanium dioxide, aluminium oxide, vermiculite, zinc oxide, mica, talc, iron oxide, barium sulphate and slaked lime; the particle size of these fillers is generally of the order of 0.001 to 300 $\mu$m.

The cure catalyst compounds (E) are well known to a person skilled in the art; they are carboxylic acid salts or halides of metals such as, for example, lead, zinc, zirconium, titanium, iron, barium, calcium, manganese and most particularly tin.

The following may be mentioned:

the products of reaction of tin dicarboxylates and ethyl polysilicate (U.S. Pat. No. 3,862,919)

the products of reaction of dibutyltin diacetate and of an alkyl silicate or of an alkyl trialkoxysilane (BE-A-842 305)

tin bischelates (EP-A-147 323 and 235 049)

diorganotin dicarboxylates (GB-A-1 289 900). They may be used in quantities that can range up to approximately 3 parts by weight, preferably close to 0.05 to 1 part by weight, per 100 parts of oil (A).

The surface-active agents used are preferably nonionic; examples which may be mentioned are alkoxylated fatty acids, polyalkoxylated alkylphenols, polyalkoxylated fatty alcohols, polyalkoxylated or polyglycerolated fatty amides, polyglycerolated alcohols and alpha-diols, ethylene oxide-propylene oxide block polymers as well as alkylglucosides, alkylpolyglucosides, sugar ethers, sugar esters, sugar glycerides, sorbitan esters and the ethoxylated compounds of these sugar derivatives.

The anionic surface-active agents may be chosen for example from alkali metal alkylbenzenesulphonates, alkyl sulphates, alkyl ether sulphates, alkyl aryl ether sulphates and dioctyl sulphosuccinates.

The (mixture of) surfactant(s) is chosen as a function of the nature of the silicone oil (A) to be emulsified; an HLB value of the order of 11 to 15 is generally chosen to emulsify a silicone oil (A) consisting of an $\alpha,\omega$-bis(hydroxy) polydimethylsiloxane polymer.

The weight ratio of water/water+surfactant(s) is a function of the viscosity of the silicone phase (F) and of the nature of the (mixture of) surfactant(s); this ratio is, for example, of the order of 20/100 to 70/100, preferably of the order of 25/100 to 60/100, to stabilize an emulsion of a silicone phase consisting of an $\alpha,\omega$-dihydroxylated oil with a viscosity of the order of 30 to 500 Pa s with the aid of a nonylphenol containing 9 or 10 ethoxy units as the only surface-active agent.

The silicone phase (F) placed in "oil in water" emulsion by kneading in the presence of water and of at least one surface-active agent may consist of:

(F1) an oil (A) with a viscosity of at least 3 Pa s, preferably of the order of 50 to 1000 Pa s, (F2) a mixture of oils (A), a mixture with a viscosity of at least 3 Pa s, preferably of the order of 50 to 1000 Pa s, (F3) a mixture of at least one oil (A) and of at least one crosslinking agent (B) if the latter is necessary and/or a silane (C) and/or at least one filler (D), a mixture with a viscosity of at least 3 Pa s, preferably of the order of 50 to 1000 Pa s, (F4) a mixture of at least one oil (A) and of the catalytic compound (E), optionally in the presence of at least one silane (C) and/or at least one filler (D).

The "oil in water" emulsification of the silicone phase is performed by introducing the silicone phase into a mixture of water+surface-active agent(s) or preferably by introducing water into a mixture of silicone phase+surface-active agent(s) and kneading at a temperature of the order of 10° to 50° C.

Any conventional kneading equipment may be used, especially slowly-stirred equipment. Thus, the kneading operation may be performed in a kneader fitted with an agitator, an agitator whose mobile part does not rotate at more than 2500 revolutions/min (preferably not more than 1500 revolutions/min and most particularly not more than 500 revolutions/min) with a tangential speed at the end of a mobile part not exceeding 20 m/s (preferably not exceeding 5 m/s and most particularly not exceeding 2.5 m/s); advantageously the ratio of tangential speed at the end of the moving part to the distance between the end of the moving part and the wall of the kneader is lower than 50000 $s^{-1}$, preferably lower than 10000 $s^{-1}$ and more particularly lower than 2500 $s^{-1}$)

By way of example it is possible to mention single- or multiple-screw extruders, planetary mixers, hook mixers, slow dispersers, static mixers and blade, propeller, arm and anchor mixers.

After optional dilution of the mixture, the constituents of the dispersion of the invention which are not present in the "oil in water" emulsion thus prepared, namely in the case of the emulsion of the silicone phase (F1), (F2) or (F3), the catalytic compound preferably in the form of an aqueous emulsion and the other optional constituents not present in the said phases, in the case of the emulsion of the silicone phase (F4) the crosslinking agent (B) if the latter is necessary, as well as the other optional constituents not present in the said phase, are introduced and dispersed in the mixture by kneading in a kneader of the same type as those mentioned above, preferably in that which has been used for the emulsification.

The dispersions forming the subject of the invention may additionally contain other additives, such as plasticizers such as, for example, polydimethylsiloxane oils with a viscosity of the order of 300 to 10,000 mPa s, dioctyl phthalates and dialkylbenzenes, optionally in aqueous emulsion, in quantities of 0 to 70 parts by weight per 100 parts by weight of oil (A), thickening agents such as water-soluble polymers of molecular mass greater than 10 000 g/mole, such as, for example, alkali metal polyacrylates, polyvinyl alcohols, polyethylene glycols, polyvinylpyrrolidones, carrageenans, alginates, methyl celluloses, hydroxyalkyl celluloses and xanthan gum, in quantities which may be in a range up to 10% by weight of the final aqueous dispersion, filler-dispersing agents such as, for example, alkali metal polyacrylates of molecular mass lower than 5 000 and inorganic phosphates, in quantities which may be in a range up to 10% by weight of the final aqueous dispersion.

These additives may be introduced either into the silicone phase before it is emulsified or into the emulsion before dilution.

The various constituents of the dispersion of the invention are present in quantities such that the solids content is higher than 40%, generally of the order of 70 to 97%; the pH is adjusted between 4 and 13 by adding organic or inorganic acids or bases (for example potassium hydroxide or amines).

The final dispersion obtained is homogenized and then degassed; it is then packaged in a package which is impervious to air and water vapour.

The dispersions forming the subject of the invention may be employed for example for the manufacture of elastomer paints, agents for imparting water repellency to facades, seals and fire-resistant elastomer products.

The examples are given by way of indication and cannot be considered as a limit of the scope and of the concept of the invention.

EXAMPLE 1

Preparation of the emulsion of the silicone phase (F) consisting of the hydroxylated oil (A)

The following are introduced into a 5-liter arm kneader of Kustner® type (marketed by Kustner):

1500 g of α,ω-bis(hydroxy)polydimethylsiloxane oil with a viscosity of 175 Pa s (48 V 175000 oil)

then 75 g of Cemulsol NP 9® (nonylphenol containing 9 ethoxy units, marketed by Rhône-Poulenc) exhibiting an HLB of 12.8.

The mixture is stirred for 15 minutes at 90 revolutions/minute.

100 g of water are then poured slowly over approximately 10 minutes with the same stirring, and the mixture is then kneaded with the same stirring for 150 minutes; the weight ratio of water/water+surfactant is 0.57.

(The dynamic viscosity of this surfactant/water mixture is 380 Pa s at a shear rate of 1 $s^{-1}$.)

The emulsion obtained has a particle size of 375 nm. It is then diluted with 584 g of water in order to obtain a solids content of 70%.

Preparation of the aqueous dispersion and of a water sealant

The following are added to 429 g of the diluted emulsion thus obtained:

6.6 g of an aqueous solution containing 50% of potassium hydroxide (KOH) and 1.56 g of an aqueous emulsion containing 38% by weight of dioctyltin dilaurate (stabilized with polyvinyl alcohol).

The mixture is homogenized for 10 min with the aid of a turbine.

After the mixture has been transferred into a Meili® arm kneader (marketed by Meili) of 1.6 liter capacity, 210 g of precipitated and coated calcium carbonate (Winnofil SP®) marketed by ICI) are added; kneading is performed for 30 min and then 21 g of a silicone DT resin are introduced, containing 2.2% by weight of hydroxyl groups and consisting of 70% by weight of $CH_3SiO_{1.5}$ units and 30% by weight of $(CH_3)_2SiO$ units and exhibiting a viscosity of 5400 mPas.

The dispersion is homogenized by kneading for 30 min; it is debubbled under vacuum and with stirring for 10 min and then packaged in packaging which is impervious to water vapour (polyethylene cartridge). Its pH is close to 9.5.

After 4 days' storage at 25° C., the dispersion is spread with a doctor blade so as to produce a film of 2 mm thickness, which is left to dry for 7 days at ambient temperature.

The following mechanical properties are measured on the dried films:

Shore A hardness (SAH) according to ASTM standard D-2240 tensile strengths (T/S) according to ASTM standard D-46 002, corresponding to ASTM standard D-412, in MPa elongation at break (E/B) in % according to AFNOR standard T-46 002 elastic modulus (Ml00) at 100% elongation, according to AFNOR standard T-46 002, in MPa.

The pressure-adhesiveness of the aqueous dispersions to glass and concrete is evaluated by depositing beads from 3 to 4 mm in thickness and leaving the beads to dry on these supports for a fortnight; the adhesiveness is then assessed by pulling the dry beads manually. The stability of the aquous dispersion is evaluated by subjecting it in its leakproof package to thermal aging in an oven at 50° C. for 7 to 14 days; a film of 2 mm thickness is withdrawn and left to dry for 7 days at ambient temperature before its mechanical properties are rechecked.

The results obtained are calculated in Table 1.

EXAMPLE 2

Preparation of the emulsion of the silicone chase (F) consisting of the hyroxylated oil (A)

The operation of preparation of the emulsion of oil (A) described in Example 1 is repeated, starting with 1500 g of 48 V 175000 oil 150 g of Cemulsol NP 9

150 g of water introduced over approximately 10 min.

A stable emulsion of 380 nm is obtained after 90 minutes' kneading at 90 revolutions/minute. This is diluted to a solids content of 75% by adding 555 g of water and rekneading for 20 minutes.

Preparation of the aqueous dispersion and of a water sealant

The operation of preparation of the water sealant described in Example 1 is repeated, starting with the emulsion of the oil (A) prepared above.

The properties of the sealant obtained appear in Table 1.

EXAMPLE 3

Preparation of the emulsion of the silicone phase (F) consisting of the hydroxylated oil (A)

The following are introduced into the kneader of Example 1:

1500 g of 48 V 175000 oil 37.5 g of Cemulsol NP 5® (nonylphenol containing 5 ethoxy units, marketed by Rhône-Poulenc) of HLB=10

112.5 g of Cemulsol NP 12® (nonylphenol containing 12 ethoxy units, marketed by Rhône-Poulenc) of HLB=14.

The mixture of surfactants exhibits an HLB of approximately 12.

After kneading for 20 minutes at 90 revolutions/minute 100 g of water are added over approximately 6 min; kneading is performed in the same conditions for 1 hour; an additional 30 g of water are added over approximately 2 min and stirring is continued in the same conditions for 1 hour.

The mean particle size of the emulsion obtained is 580 nm. The emulsion is adjusted to a solids content of 75% by dilution with 470 g of water.

Preparation of the aqueous dispersion and of a water sealant

The following are introduced into the 1.6-1 Meili arm kneader:

471 g of the diluted emulsion prepared 1.56 g of an aqueous emulsion containing 37% of dioctyltin dilaurate and stabilized with polyvinyl alcohol and kneading is performed for 30 min.

30 g of α,ω-bis(trimethyl)polydimethylsiloxane with a viscosity of 100 mPa s are added.

Kneading is performed for 15 min.

21 g of the silicone DT resin used in Example 1 are introduced; kneading is performed for 20 min and then 10 g of aqueous solution containing 50% of KOH are added. The mixture is homogenized for 20 min at atmospheric pressure and 5 min under vacuum to debubble the sealant before packaging in a cartridge.

The properties of the sealant obtained appear in Table 1.

EXAMPLE 4

Preparation of the emulsion of the silicone phase (F) consisting of the hydroxylated oil (A)

The following are introduced into the kneader of Example 1:
1500 g of 48 V 175000 oil
a mixture, preheated to 50° C., of
45 g of Genapol X 050® (ethoxylated fatty alcohol marketed by Hoechst) of HLB=10
45 g of Genapol UD 110® (ethoxylated fatty alcohol marketed by Hoechst) of HLB=15.

The surfactant mixture has an HLB of approximately 12.5. After kneading for 20 minutes at 90 revolutions/minute 105 g of water are introduced over approximately 6 min.

A twin-population emulsion is obtained by kneading at 90 revolutions/minute, consisting of 95% by volume of a first population of 785 nm mean diameter and of 5% of a second population of 298 nm diameter. The solids content of the final emulsion is adjusted to 76% by addition of 440 g of water and rekneading at 90 revolutions/minute for 20 minutes.

Preparation of the aqueous dispersion and of a water sealant
The following are introduced in succession into the 1.6–1 Meili arm kneader:
423 g of the above emulsion
1.56 g of tin dilaurate emulsion
210 g of Socal 312 N® calcium carbonate
(marketed by Solvay)
21 g of the DT resin described in Example 1
10 g of solution containing 50% of KOH
and 6 g of water
with kneading for 20 min each time after incorporation of each of the constituents of the mixture.
The final dispersion is debubbled under vacuum for 5 min and packaged in a leakproof package.
It properties appear in Table 1.

EXAMPLE 5

Preparation of the methoxyfunctional oil (A)
The following are introduced into the kneader of Example 1:
1500 g of 48 V 175000 oil
15 g of vinyltrimethoxysilane.

After 10 minutes' stirring at 90 revolutions/min 7.95 g of a methanolic solution containing 3.75% of lithia (LiOH·H$_2$O) are added; stirring is performed for 25 minutes in the same conditions before the mixture is neutralized by adding 6 g of the product of reaction of phosphoric acid with octamethylcyclotetrasiloxane which assays for 8.5% of H$_3$PO$_4$.

Preparation of the emulsion of the silicone phase (F) consisting of the methoxyfunctional oil (A)
A mixture of
75 g of Cemulsol NP 5 and 75 g of Cemulsol NP 12
is added to the oil obtained.

The mixture is kneaded at 90 revolutions/minute for 10 minutes; 130 g of water are added slowly over approximately 8 min and mixing is then performed for 90 minutes at 90 revolutions/minute.
An emulsion of 535 nm mean particle size is obtained, which is diluted with 420 g of water.

Preparation of the aqueous dispersion and of a water sealant
The following are introduced into the 1.6-liter Meili arm kneader
447 g of the emulsion of the methoxy-functional oil (A) prepared above, and
1.56 g of aqueous emulsion containing 37% of dioctyltin dilaurate.

After kneading for 15 min 150 g of Socal 312N carbonate are incorporated; kneading is performed again for 45 min, the mixture is deaerated under vacuum and packaged in a leakproof cartridge.
The properties of the sealant appear in Table 1.

EXAMPLES 6 TO 9

Example 5 is reproduced by adding 3 g of the following aminosilanes respectively to the aqueous dispersion:

N-methyl-3-aminopropyltrimethoxysilane
N-aminoethyl-3-aminopropyltrimethoxysilane
3-aminopropyltriethoxysilane
N-aminoethyl-3-aminopropylmethyl-dimethoxysilane.

The properties of the mixtures stored in a cartridge appear in Table 2.

EXAMPLE 10

Preparation of the methoxyfunctional oil (A)
The operation described in Example 5 is repeated using 45 g of vinyltrimethoxysilane instead of 15 g.
Preparation of the emulsion of the silicone phase (F) consisting of the methoxyfunctional oil (A)
150 g of Cemulsol NP 70 (nonylphenol containing 7 ethoxy units, marketed by Rhone-Poulenc) of HLB=11.7 are added to the oil obtained.
Kneading is performed for approximately 5 minutes at 90 revolutions/minute and then 160 g of water are added over approximately 10 min and kneading is performed for 90 minutes at 90 revolutions/minute.
The emulsion obtained has a mean particle size of 1670 rm; it is then diluted by addition of 390 g of water.
Preparation of the dispersion and of a water sealant
The following are introduced into the 1.6-1 Meili kneader:
465 g of the emulsion prepared above
1.56 g of dioctyltin dilaurate emulsion.
After stirring for 15 min 150 g of Socal 312N carbonate are incorporated and kneading is performed for 30 min. 3 g of N-methyl-3-aminopropyltrimethoxysilane are added; stirring is performed for 30 min before applying vacuum and packaging in a cartridge.
The properties of the mixture obtained appear in Table 3.

EXAMPLE 11

Preparation of the emulsion of silicone phase (F)
The following are introduced into the kneader of Example 1:
1525 g of 48 V 175000 oil
15 g of N-methyl-3-aminopropyltrimethoxy-silane
The mixture is kneaded for 20 minutes at 90 revolutions/minute and then a slight vacuum is applied for 5 minutes.
A premix of
70 g of Cemulsol NP 5 and of
70 g of Cemulsol NP 9 is added.
The mixture of surfactants has an HLB of 11.4. Kneading is performed for 10 minutes at 90 revolutions/minute and 120 g of water are then introduced over approximately 7 min with stirring; the mixture is kneaded for 45 minutes at 90 revolutions/minute.
The emulsion obtained has a mean particle size of 2400 nm. 30 g of water are added over approximately 3 min and kneading is continued in the same conditions for 90 minutes; the particle size is then 1790 nm. The emulsion is diluted with 400 g of water to have a solids content of 74%.
Preparation of the dispersion and of a water sealant
The following are introduced into the 1.6-1 Meili arm kneader:
405 g of the emulsion prepared above and
1.56 g of dioctyltin dilaurate emulsion.
Kneading is performed for 15 min. 150 g of Socal 312N carbonate are incorporated, kneaded for 30 min and deaerated under vacuum and the mixture is packaged in a cartridge.
The properties of the mixture appear in Table 3.

EXAMPLE 12

Preparation of the methoxyfunctional oil (A)
The following are introduced into the kneader of Example 1:
1500 g of 48 V 175000 oil 45 g of vinyltrimethoxysilane.

After 5 minutes' stirring at 90 revolutions/min 12 g of a methanolic solution containing 3.75% of lithia are added; stirring is performed for 20 minutes at 90 revolutions/min and the mixture is then neutralized with 9 g of the product of reaction of phosphoric acid with octamethyltetracyclosiloxane assaying at 8.5% of $H_3PO_4$.

After 15 minutes' stirring in the same conditions the product is deaerated under vacuum for 15 minutes.

Preparation of the emulsion of the silicone Phase (F) consisting of the methoxyfunctional oil (A)

A mixture of
   75 g of Cemulsol NP 5 and of
   75 g of Cemulsol NP 12
is added to the oil thus obtained.

Stirring is performed for 5 minutes at 90 revolutions/min and 130 g of water are then introduced over approximately 8 min.

After 90 minutes' kneading at 90 revolutions/minute an emulsion of 630 nm particle size is obtained.

It is then diluted by adding 420 g of water.

Preparation of the dispersion and of a water sealant

The following are introduced into the 1.6-1 Meili kneader:
   453 g of the emulsion prepared above and
   1.56 g of dioctyltin dilaurate emulsion.

Stirring is performed for 15 min and 150 g of Socal 312N carbonate are then introduced; kneading is performed for 30 min.

6 g of N-methyl-3-aminopropyltrimethoxysilane are then added; kneading is performed for 30 min and the mixture is deaerated under vacuum and packaged in a cartridge. The properties of the mixture appear in Table 3.

The pH of the dispersion is 8.

EXAMPLE 13

Preparation of the emulsion of the silicone Phase (F)

The following are introduced into the kneader of Example 1:
   1500 g of 48 V 175000 oil
   3 g of dioctyltin dilaurate dispersed in 30 g of α,ω-bis (trimethyl)polydimethylsiloxane oil with a viscosity of 50 mPa s.

The mixture is kneaded for 15 minutes at 90 revolutions/min.

150 g of Cemulsol NP 9 are added and stirring is performed for 15 minutes at 90 revolutions/min. 120 g of water are then poured in slowly over approximately 10 minutes with the same stirring and the mixture is then kneaded with the same stirring for 150 minutes.

The emulsion obtained has a particle size of 410 nm. This is then diluted with 430 g of water in order to obtain a solids content of 75%.

Preparation of the dispersion and of a water sealant

The following are introduced in succession into the 1.6-1 Meili arm kneader:
   471 g of the emulsion prepared above
   210 g of Winnofil® SP calcium carbonate (marketed by ICI)
   21 g of silicone DT resin described in

EXAMPLE 1

10 g of solution containing 50% of KOH kneading for 30 minutes each time after incorporation of each of the constituents of the mixture.

The final dispersion is debubbled under vacuum for 5 minutes and packaged in leakproof packaging. Its properties appear in Table 3.

Preparation of the emulsion of silicone Phase (F)

The following are introduced into the kneader of Example 1:
   1500 g of 48 V 175000 oil
   45 g of FK 160® precipitated silica marketed by Degussa.

The mixture is kneaded for 20 minutes at 70 revolutions/min.

The following are added:
   75 g of Cemulsol NP 5
   75 g of Cemulsol NP 12.

The mixture is kneaded for 15 minutes at 70 revolutions/min.

150 g of water are then poured in slowly over 10 minutes with stirring at 90 revolutions/min and kneading is then performed for 150 minutes with the same stirring.

The emulsion obtained has a particle size of 440 nm. It is then diluted with 400 g of water; a solids content of 76.2% is obtained.

Preparation of the dispersion and of the water sealant

The following are introduced in succession into the 1.6-1 Meili arm kneader:
   447 g of the emulsion prepared above
   1.56 g of an aqueous emulsion containing 37% of dioctyltin dilaurate, stabilized with polyvinyl alcohol.
   150 g of Winnofil SP calcium carbonate
   21 g of silicone DT resin described in Example 1
   10 g of solution containing 50% of KOH kneading for 30 minutes after each incorporation of a constituent.

The final dispersion is debubbled under vacuum for 5 minutes and packaged in leakproof packaging. Its properties appear in Table 3.

TABLE 1

| Example | 1 | 2 | 3 | 4 |
|---|---|---|---|---|
| Properties | | | | |
| SAH | 30 | 20 | 16 | 16 |
| T/S | 1.25 | 1.23 | 1.27 | 0.53 |
| E/B | 700 | 770 | 930 | 176 |
| M100 | 0.45 | 0.36 | 0.30 | 0.31 |
| adhesiveness | | | | |
| to glass | medium | good | excellent | medium |
| to concrete | medium | medium | excellent | medium |
| properties after 14 d at 50° C. | | | after 7 d at 50° C. | |
| SAH | 24 | 16 | 15 | — |
| T/S | 0.91 | 0.72 | 0.80 | — |
| E/B | 663 | 724 | 800 | — |
| M100 | 0.36 | 0.27 | 0.28 | — |

TABLE 2

| Example | 5 | 6 | 7 | 8 | 9 |
|---|---|---|---|---|---|
| Properties | | | | | |
| SAH | 8 | 15 | 15 | 15 | 21 |
| T/S | 0.76 | 0.89 | 1.21 | 0.96 | 1.33 |
| E/B | 706 | 770 | 564 | 630 | 733 |
| M100 | 0.16 | 0.25 | 0.28 | 0.27 | 0.34 |

TABLE 2-continued

| Example | 5 | 6 | 7 | 8 | 9 |
|---|---|---|---|---|---|
| adhesiveness | | | | | |
| to glass | medium | good | excellent | medium | medium |
| to concrete | medium | excellent | excellent | excellent | good |
| properties after 14 d at 50° C. | | | | | |
| SAH | 3 | 7.5 | 8.5 | 7.5 | — |
| T/S | 0.70 | 0.64 | 1.07 | 0.87 | — |
| E/B | 823 | 722 | 800 | 767 | — |
| M100 | 0.10 | 0.18 | 0.22 | 0.18 | — |

TABLE 3

| Example | 10 | 11 | 12 | 13 | 14 |
|---|---|---|---|---|---|
| Properties | | | | | |
| SAH | 17 | 16 | 20 | 20 | 25 |
| T/S | 0.62 | 0.7 | 1.06 | 1.2 | 1.38 |
| E/B | 610 | 700 | 710 | 880 | 670 |
| M100 | 0.28 | 0.26 | 0.33 | 0.34 | 0.51 |
| adhesiveness | | | | | |
| to glass | — | good | — | excellent | excellent |
| to concrete | — | excellent | — | excellent | excellent |
| properties after 14 d at 50° C. | | | | | |
| SAH | — | 11 | 20 | 17 | — |
| T/S | — | 0.54 | 0.99 | 0.50 | — |
| E/B | — | 600 | 440 | 620 | — |
| M100 | — | 0.21 | 0.39 | 0.26 | — |

We claim:

1. A process for treating a surface comprising the steps of:
    (1) forming an emulsion of at least one organopolysiloxane oil in water, said emulsion prepared by kneading a mixture comprising (i) 100 parts by weight of a silicone phase having a dynamic viscosity at 25° C. at least equal to 3 Pa·s, said silicone phase comprising at least one organopolysiloxane oil; (ii) 2 to 20 parts by weight of water; and (iii) 3 to 20 parts by weight of one or more surface-active agents having an HLB value of at least 10; the weight ratio of components (ii)/((ii)+(iii)) being between 0.2 and 0.7; where said entire kneading step is carried out for a period of time in a single mixer equipped with one or more stirrers in which the moving part of said one or more stirrers does not rotate at more than 500 revolutions/min with a tangential speed at the end of the moving part not exceeding 2.5 m/s wherein said kneading step produces an oil-in-water emulsion having a particle size of 0.1 to 5 micrometers;
    (2) diluting said emulsion with water to yield a dilute emulsion having a solids content of between 25 to 97%; and
    (3) adding the following components:
        (a) 0.1 to 100 parts by weight of one or more crosslinking agents per 100 parts by weight organopolysiloxane oil;
        (b) 0 to 50 parts by weight of a silane per 100 parts by weight organopolysiloxane oil;
        (c) 0 to 300 parts by weight of a siliceous or nonsiliceous inorganic filler per 100 parts by weight: organopolysiloxane oil; and
        (d) a catalytically effective amount of a cure catalyst, whereby a dispersion is formed;
    (4) coating said dispersion on said surface; and
    (5) crosslinking the polymer of said dispersion on said surface by means of a condensation reaction.

2. A process for forming an aqueous dispersion having utility as a sealant composition when applied onto a surface and crosslinked via a condensation reaction comprising the steps of:
    (1) forming an emulsion of at least one organopolysiloxane oil in water, said emulsion prepared by kneading a mixture comprising (i) 100 parts by weight of a silicone phase having a dynamic viscosity at 25° C. at least equal to 3 Pa·s, said silicone phase comprising at least one organopolysiloxane oil;
    (ii) 2 to 20 parts by weight of water; and (iii) 3 to 20 parts by weight of one or more surface-active agents having an HLB value of at least 10; the weight ratio of components (ii)/((ii)+(iii)) being between 0.2 and 0.7; where said entire kneading step is carried out for a period of time in a single mixer equipped with one or more stirrers in which the moving part of said one or more stirrers does not rotate at more than 500 revolutions/min with a tangential speed at the end of the moving part not exceeding 2.5 m/s wherein said kneading step produces an oil-in-water emulsion having a particle size of 0.1 to 5 micrometers;
    (2) diluting said emulsion with water to yield a dilute emulsion having a solids content of between 25 to 97%; and
    (3) adding the following components:
        (a) 0.1 to 100 parts by weight of one or more crosslinking agents per 100 parts by weight organopolysiloxane oil;
        (b) 0 to 50 parts by weight of a silane per 100 parts by weight organopolysiloxane oil;
        (c) 0 to 300 parts by weight of a siliceous or nonsiliceous inorganic filler per 100 parts by weight organopolysiloxane oil; and
        (d) a catalytically effective amount of a cure catalyst;
whereby said dispersion is formed.

* * * * *

UNITED STATES PATENT AND TRADEMARK OFFICE
CERTIFICATE OF CORRECTION

PATENT NO. : 5,851,594
DATED : December 22, 1998
INVENTOR(S) : Michael Feder et al.

It is certified that error appears in the above-identified patent and that said Letters Patent is hereby corrected as shown below:

Column 4,
Line 54, "$(R^5)_{cl\ Si(\ R\ )4-c}$" should read -- $(R^5)_c\ Si(R)_{4-c}$ --

Column 8,
Line 13, "chase" should read -- phase --

Column 10,
Line 9, "methoxvunctional" should read -- methoxyfunctional --
Line 13, "methoxvfunctional" should read -- methoxyfunctional --

Column 11,
Line 59 and 60, "EXAMPLE 1" should read -- EXAMPLE 14 --

Signed and Sealed this

Eighth Day of January, 2002

*Attest:*

JAMES E. ROGAN
*Attesting Officer*    *Director of the United States Patent and Trademark Office*